US009484696B2

(12) United States Patent
Yamanaka et al.

(10) Patent No.: US 9,484,696 B2
(45) Date of Patent: Nov. 1, 2016

(54) BULB SOCKET AND LIGHTING SYSTEM

(71) Applicant: Yazaki Corporation, Tokyo (JP)

(72) Inventors: Hideki Yamanaka, Makinohara (JP);
Atsuro Murata, Makinohara (JP);
Ryohei Konishi, Fujieda (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/338,820

(22) Filed: Jul. 23, 2014

(65) Prior Publication Data

US 2014/0334184 A1 Nov. 13, 2014

Related U.S. Application Data

(63) Continuation of application No. PCT/JP2013/000315, filed on Jan. 23, 2013.

(30) Foreign Application Priority Data

Jan. 26, 2012 (JP) .................... 2012-013939

(51) Int. Cl.
*H01R 33/00* (2006.01)
*H01R 33/09* (2006.01)
(Continued)

(52) U.S. Cl.
CPC ............. *H01R 33/09* (2013.01); *B60Q 3/0203* (2013.01); *F21S 48/212* (2013.01); *F21V 19/0005* (2013.01); *F21V 23/06* (2013.01); *H01R 13/112* (2013.01); *H01R 2201/26* (2013.01)

(58) Field of Classification Search
CPC .... B60Q 3/0203; H01R 33/09; H01R 33/18; H01R 13/12; H01R 13/10; F21V 23/06; F21V 19/005; F21V 17/104; F21V 17/16; F21V 17/164; F21V 19/00; F21S 48/212
USPC ............ 439/619, 699.2, 611, 617, 856, 736; 362/657
See application file for complete search history.

(56) References Cited

U.S. PATENT DOCUMENTS 3,017,599 A 1/1962 Loesch
3,950,061 A * 4/1976 Kausen .................. H01R 33/09
439/385

(Continued)

FOREIGN PATENT DOCUMENTS

EP 1156560 A1 11/2001
JP H07254466 A 10/1995
JP 2009-173163 A 8/2009

OTHER PUBLICATIONS

International Search Report and Written Opinion dated Apr. 10, 2013, issued for PCT/JP2013/000315.
(Continued)

*Primary Examiner* — Y M Lee
(74) *Attorney, Agent, or Firm* — Locke Lord LLP

(57) ABSTRACT

A pair of terminal portions of a bus bar is composed of a first terminal portion and a second terminal portion extended along a sidewall of the base portion. Each of the first and second terminal portions has a spring portion for generating biasing force toward a direction of holding the base portion, and a contact portion provided on a tip of the spring portion. The contact portion of the first terminal portion abuts on a contact lead wire, and the contact portion of the second terminal portion abuts on the sidewall of the base portion, thereby the contact portions hold the base portion therebetween. In a natural condition that the bulb is not inserted and the spring portion is not elastically deformed, the pair of terminal portions is displaced from a center plane toward the one side corresponding to a projection size of the contact lead wire.

9 Claims, 7 Drawing Sheets

(51) Int. Cl.
- *B60Q 3/02* (2006.01)
- *F21S 8/10* (2006.01)
- *F21V 19/00* (2006.01)
- *F21V 23/06* (2006.01)
- *H01R 13/11* (2006.01)

(56) References Cited

U.S. PATENT DOCUMENTS

| | | |
|---|---|---|
| 4,894,027 A | 1/1990 | Brantingham et al. |
| 4,902,251 A | 2/1990 | Grzena |
| 5,558,543 A * | 9/1996 | Takano ............... F21V 17/06 362/296.05 |
| 2009/0191766 A1 | 7/2009 | Nagai et al. |
| 2010/0195348 A1 | 8/2010 | Ohtsuka et al. |
| 2010/0208482 A1 * | 8/2010 | Ohtsuka ............ B60Q 3/0203 362/520 |

OTHER PUBLICATIONS

Notification of Reasons for Refusal issued in corresponding Japanese Patent Application No. JP 2012-013939, dated Jan. 12, 2016.

\* cited by examiner

BULB SOCKET AND LIGHTING SYSTEM

CROSS REFERENCE TO RELATED APPLICATIONS

This application is related to co-pending application: "BULB SOCKET AND LIGHTING SYSTEM" filed even date herewith in the names of Hideki Yamanaka, Atsuro Murata and Ryohei Ochiai as a national phase entry of PCT/JP2013/000314, which application is assigned to the assignee of the present application and is incorporated by reference herein.

TECHNICAL FIELD

This invention relates to a bulb socket for holding a bulb and to a lighting system.

BACKGROUND ART

In a field of an on-vehicle interior lighting system, for example, it is proposed a bulb socket structure including: a resin-made socket main body for mounting a bulb such as a wedge base bulb; and a pair of power feeding terminals provided on the socket main body. A base portion of a bulb is inserted into a mounting hole in the socket main body, and the base portion is held between the pair of power feeding terminal (for example, see PTL 1). As shown in FIG. 8, in a bulb socket structure described in PTL 1, a pair of power feeding terminals 101 includes a pair of holding pieces 102 for holding a base portion 111 of a bulb 110 therebetween. When the base portion 111 is inserted into between the pair of holding pieces 102, the pair of holding pieces 102 is elastically deformed in a direction separating from each other, and a biasing force caused by the deformation holds the base portion 111, thereby the bulb 110 is held in the socket 100.

CITATION LIST

Patent Literature

[PTL 1]
JP, A, 2009-173163

SUMMARY OF INVENTION

Technical Problem

However, in a conventional bulb socket such as described in PTL 1, when holding the bulb 110 on which a contact lead wire 112 is provided along a sidewall of its base portion 111, elastic deformation amounts of the pair of holding pieces 102 holding the base portion 111 may be different between the holding piece 102 abutting on the contact lead wire 112 so as to electrically connect the power feeding terminals 101 with the bulb 110 and the holding piece 102 abutting on the sidewall of the base portion 111 of the bulb 110. Thus, when the elastic deformation amounts are different between the pair of holding pieces 102, stress applied to each of the pair of holding pieces 102 differs. Therefore, when the pair of holding pieces 102 holds the bulb 110 for a long time, or the bulb 110 is changed repeatedly, so-called settling may easily occur at the holding pieces 102 having the larger deformation amount. Therefore, a holding power of the bulb 110 may be reduced, and there is a problem that the bulb held by the pair of holding pieces 102 may rattle, or may fall down out of the pair of holding pieces 102.

Accordingly, an object of the present invention is to provide a bulb socket and a lighting system able to prevent a holding power of a bulb from being reduced.

Solution to Problem

For attaining the object, according to a first aspect of the present invention, there is provided a bulb socket for holding a bulb having a light-emitting portion, a base portion, and a contact lead wire provided on one side wall of the base portion, said bulb socket including:

a socket main body having an insertion hole for receiving the base portion of the bulb;

a terminal fitting attached to the socket main body and configured to be electrically connected to the contact lead wire, wherein the terminal fitting has a fixed portion to be fixed to the socket main body and a pair of terminal portions extended from the fixed portion, wherein the pair of terminal portions is composed of a first terminal portion to be extended along the one side wall of the base portion which is inserted into the insertion hole, and a second terminal portion to be extended along the other side wall opposite to the one side wall of the base portion, said first and second terminal portions facing each other across a center plane between the one and the other side walls, wherein each of the first and second terminal portions has a spring portion for biasing in a direction holding the base portion, and a contact portion provided at a tip of the spring portion, wherein the contact portion of the first terminal portion is provided in a manner able to abut on the contact lead wire, and the contact portion of the second terminal portion is provided in a manner able to abut on the other side wall of the base portion, wherein the pair of terminal portions is formed eccentrically toward one side from the center plane in a natural condition that the bulb is not inserted and the spring portions are not elastically deformed, and this eccentric distance is set less than a projection size R of the contact lead wire projected from the one side wall of the base portion.

According to a second aspect of the present invention, there is provided the bulb socket as described in the first aspect, wherein in the natural condition, the eccentric distance of the pair of terminals relative to the center plane is set half the projection size of the contact lead wire.

According to a third aspect of the present invention, there is provided the bulb socket as described in the first or second aspect, wherein the base portion of the bulb has first and second walls symmetric to each other with respect to a center axis of the base portion in the center plane, and the contact lead wires are respectively provided on the first and second walls, wherein the terminal fitting is composed of a pair of a first terminal fitting able to abut on the contact lead wire provided on the first wall and a second terminal fitting able to abut on the contact lead wire provided on the second wall.

According to a fourth aspect of the present invention, there is provided a lighting system including:

the bulb socket described in any one of the first to third aspects;

a bulb held in the bulb socket;

a protective cover covering the bulb socket and the bulb; and a transparent lens fixed to the bulb socket and the protective cover and through which light from a light-emitting portion of the bulb passes.

Advantageous Effects of Invention

According to the invention as described in the first aspect, the pair of terminal portions is formed eccentrically toward the one side in the natural condition, and the eccentric distance is set less than the projection size of the contact lead wire. Therefore, the elastic deformation amounts of the pair of spring portions can be equalized from the natural condition to a holding condition that the bulb is held (a condition that the pair of contact portions holds the base therebetween). Namely, because the terminal portions are previously eccentric toward the one side in the natural condition, the eccentric distance of the terminals ought to be set in a manner that a moving distance that the contact portion of the first terminal portion abutting on the contact lead wire is moved from the natural condition to the holding condition is equal to a moving distance of the contact portion that the second terminal portion abutting on the other side of the base portion is moved. When the pair of terminal portions is eccentric, it is unnecessary to make shapes or sizes of the spring portions or the contact portions of the first and second terminal portions different from each other. Therefore, biasing forces (stress) of the pair of spring portions of which elastic deformation amounts are equalized can also be equalized. Therefore, the spring portions are prevented from unequally settling, and the holding power of the bulb is prevented from being reduced.

According to the invention as described in the second aspect, in the natural condition, the eccentric distance of the pair of terminals is set half the projection size of the contact lead wire, namely, the contact portion of the first terminal portion is disposed the projection size of the contact lead wire further away from the center plane than the contact portion of the second terminal portion. Therefore, the moving distances of the contact portions to the holding condition are equalized, and the elastic deformation amounts of the spring portions of the terminals can be equalized.

According to the invention as described in the third aspect, when using the bulb provided with the contact lead wires on the first and second walls which are symmetric to each other with respect to the center axis of the base portion, the first and second terminal fittings respectively connected to the contact lead wires are provided. Therefore, the first and second terminal fittings are arranged symmetric to each other with respect to the center axis. Therefore, these terminal fittings can be composed of common components.

According to the invention as described in the fourth aspect, similar to the bulb socket described above, in the lighting system, elastic deformation amounts and stress of the spring portions terminal portions are equalized. Therefore, the holding power of the bulb is prevented from being reduced, and the bulb is prevented from rattling or falling out. Further, because the electric connection between the terminal fitting and the bulb is successfully maintained, a lighting trouble of the bulb is also prevented. Further, by covering the bulb socket holding the bulb with the protective cover, an external force is hard to be applied, and excessive stress to the spring portions is prevented.

DESCRIPTION OF EMBODIMENTS

Figure 1:
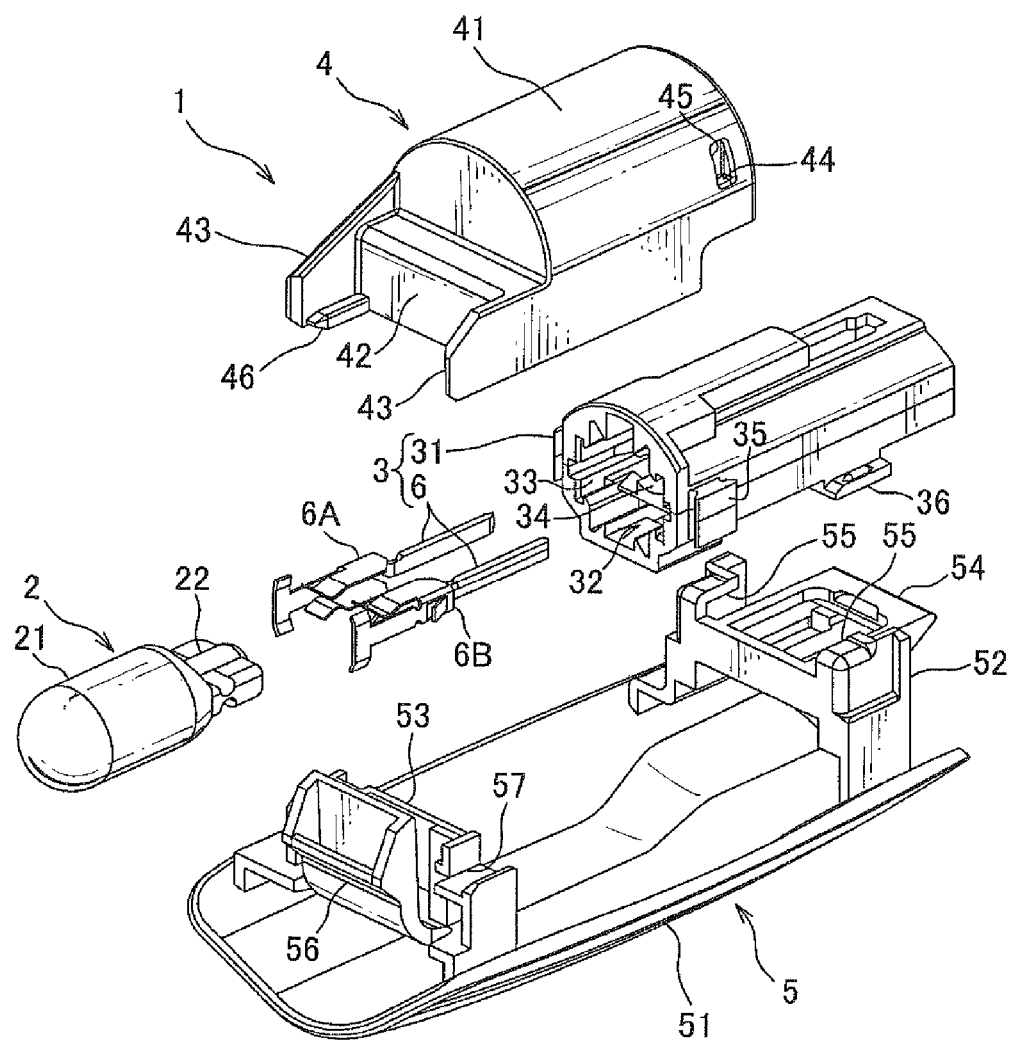
FIG. 1 is an exploded perspective view showing a lighting system according to an embodiment of the present invention.

Hereinafter, a lighting system according to an embodiment of the present invention will be explained with reference to FIGS. 1 to 7. A lighting system 1 according to this embodiment is an interior lighting system attached to a roof trim or a door trim arranged on a surface of a vehicle cabin or the like, in particular, suitable for use in a door courtesy lamp on the door trim. As shown in FIG. 1, the lighting system 1 includes: a bulb 2; a bulb socket 3 for holding the bulb 2; a protective cover 4 for coveting the bulb 2 and the bulb socket 3; and a transparent lens 5 fixed to the bulb socket 3 and the protective cover 4 and through which light emitted from the bulb 2 is passed.

Figure 2:
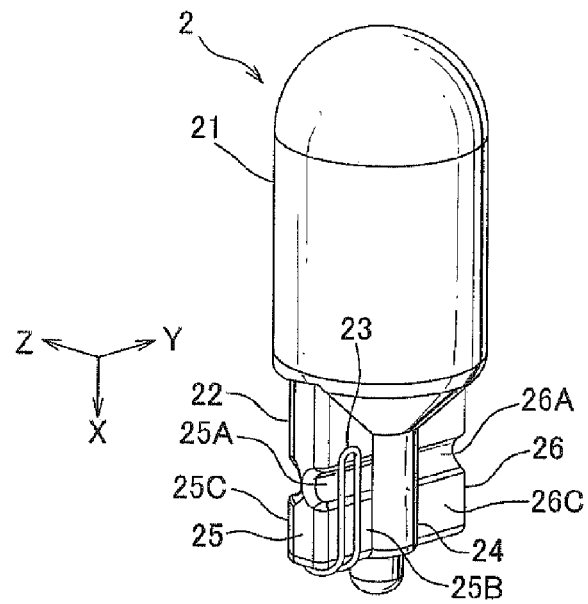
FIG. 2 is a perspective view showing a bulb used in the lighting system.
Figure 3A:
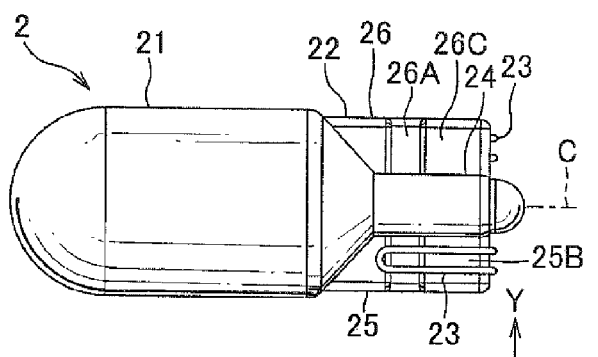
FIG. 3A is a view of three-view drawing showing the bulb.

As shown in FIGS. 2 and 3, the bulb 2 is a wedge base bulb including a light-emitting portion 21 having a filament or the like therein; a base portion 22 continued to an axial direction of the light-emitting portion 21 and working as a base of the bulb 2; and a pair of contact lead wires 23 provided along sidewalls of the base portion 22. The base portion 22 is made of insulating resin, and composed of a cylindrical portion 24 extended from the center of a base end of the light-emitting portion 21, and a pair of flat plate portions 25, 26 extended in opposite directions radially from the cylindrical portion 24.

The cylindrical portion 24 is extended along an insertion direction (X direction in FIG. 3) of the bulb 2 relative to the bulb socket 3, and the base portion 22 is formed line-symmetric with respect to the center axis C of the cylindrical portion 24 along the insertion direction. Namely, the base portion 22 is formed respectively bilaterally symmetric in an extending direction (Y direction in FIG. 3) of the flat plate portions 25, 26 and in a thickness direction (Z direction in FIG. 3) of the flat plate portions 25, 26. Further, groove portions 25A, 26A are formed in a concaved groove shape along the extending direction of the flat plate portions 25, 26 in the middle of the insertion direction. Incidentally, hereinafter, the insertion direction of the bulb 2 is also referred to as simply X direction, the extending direction of the flat plate portions 25, 26 is also referred to as simply Y direction, and the thickness direction of the flat plate portions 25, 26 is also referred to as simply Z direction.

Further, one side and the other side of the base portion 22 in this embodiment are the sides opposite to each other along Z direction. Further, a sidewall 25B of the flat plate portion 25 as a first wall and one side wall on which the contact lead wire 23 is provided, and a sidewall 26B of the flat plate portion 26 as a second wall and one side wall on which the contact lead wire 23 is provided are line-symmetric to each other with respect to the center axis C. Therefore, a sidewall 25C of the flat plate portion 25 as the other side wall opposite to the sidewall 25B, and a sidewall 26C of the flat plate portion 26 as the other side wall opposite to the sidewall 26B are line-symmetric to each other with respect to the center axis C.

The contact lead wire 23 is a conductive wire made of copper wire or the like and connected to the filament or the like in the light-emitting portion 21. One contact lead wire 23 composes a positive electrode or a negative electrode, and the other contact lead wire 23 composes a negative electrode or a positive electrode. The pair of contact lead wires 23 are respectively projected from a tip wall in the insertion direction of the flat plate portions 25, 26. The one contact lead wire 23 is extended toward the light-emitting portion 21 in the insertion direction along the sidewall 25B of the flat plate portion 25. The other contact lead wire 23 is extended toward the light-emitting portion 21 in the insertion direction along the sidewall 26B of the flat plate portion 26. The contact lead wires 23 are respectively stuck on surfaces of the sidewalls 25B, 26B. Namely, the contact lead wires 23 are respectively a shaft diameter projected from the sidewalls 25B, 26B, and the shaft diameter is a projection size R of the contact lead wire 23 from the sidewalls 25B, 26B.

Figure 3B:
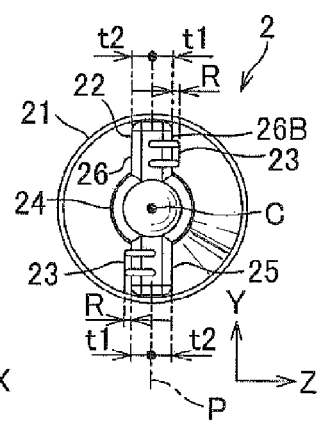
FIG. 3B is a view of three-view drawing showing the bulb.
Figure 4:
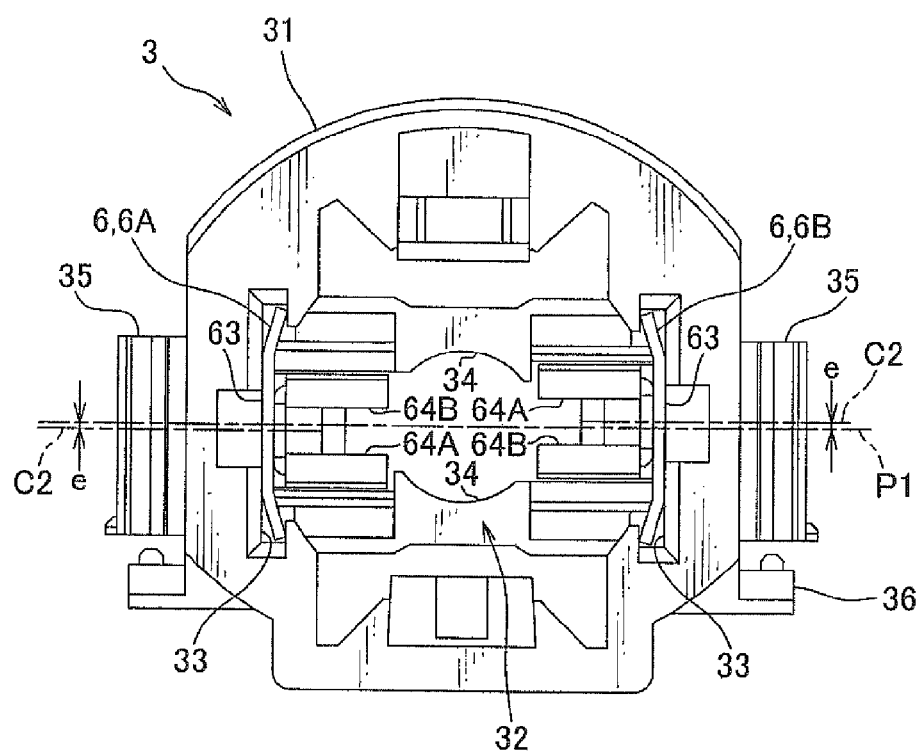
FIG. 4 is a front view showing a bulb socket of the lighting system.

As shown in FIGS. 1 and 4, the bulb socket 3 includes: a housing 31 as a socket main body having an insertion hole 32 for receiving the base portion 22 of the bulb 2; and a pair of bus bars 6 (a first bus bar 6A as a first terminal fitting and a second bus bar 6B as a second terminal fitting) provided in an inside of the housing 31 and electrically connected to the contact lead wire 23 of the bulb 2. The housing 31 is an insulating-resin-made integral molding product and formed in a tubular shape as a whole. A pair of terminal holding portions 33 for holding the terminal fitting 6 and a bulb guiding portion 34 for guiding and positioning the cylindrical portion 24 of the bulb in the insertion direction are provided on an inside of the insertion hole 32. A cover locking portion 35 for locking the protective cover 4 and a lens-engaging portion 36 for engaging with the transparent lens 5 are provided on an outer wall of the housing 31. A not-shown electric wire is routed in the housing 31 via the protective cover 4, and connected to a bus bar 6 in the housing 31 to supply electric power to the bulb 2. The bulb 2 is positioned and held in the housing 31 in a manner that a center plane P shown in FIG. 3B, passing the center axis C and extending along Y direction is coincident with a center plane P1 of the insertion hole 32 shown in FIG. 4.

The protective cover 4 is an insulating-resin-made integral molding product and includes a cover main body 41 formed in substantially a semi-cylindrical shape as a whole; an end wall portion 42 formed on one end of the cover main body 41 and covering the light-emitting portion 21 of the bulb 2 which is attached to the bulb socket 3; and a pair of flange portions 43 projected over the end wall portion 42. An inside of the cover main body 41 is provided with a reflective surface for reflecting the light emitted from the light-emitting portion 21 of the bulb 2 toward the transparent lens 5, and a lock-receiving portion 44 for locking with the cover locking portion 35 of the bulb socket 3. The lock-receiving portion 44 is able to be locked with the cover locking portion 35 by pushing the protective cover 4 onto the bulb socket 3 downward from an upper side of FIG. 1, and able to be released by an operation from a penetrating portion 45 provided on a sidewall of the cover main body 41. Further, the pair of flange portions 43 is provided with a lens-engaging portion 46 for engaging with the transparent lens 5.

The transparent lens 5 includes: a lens main body 51 made of transparent or semi-transparent resin and formed in a properly curved plate shape; and a first attaching portion 52 and a second attaching portion 53 projected from an inner wall of the lens main body 51. The first attaching portion 52 is provided with a locking piece 54 projected outward along a rear end of the bulb socket 3, and a pair of first engaging portion 55 for engaging with the lens-engaging portion 36 of the bulb socket 3. The second attaching portion 53 is provided with a locking portion 56 for engaging with a not-shown interior member of a vehicle, and a pair of second engaging portions 57 for engaging with the lens-engaging portion 46 of the protective cover 4.

The lighting system 1 described above is assembled and attached to the interior member of a vehicle as described below. First, when the base portion 22 is inserted into the insertion hole 32, the bulb 2 is held by the housing 31 having the bus bar 6 in the housing 31, and when the lock-receiving portion 44 of the protective cover 4 is locked with the cover locking portion 35 of the bulb socket 3, a functional portion is assembled by combining the bulb 2, the bulb socket 3 and the protective cover 4. Next, when the lens engaging portions 36, 46 of the bulb socket 3 and the protective cover 4 are slidingly engaged with the first and second engaging portions 55, 57 of the transparent lens 5, the lighting system 1 of which the functional portion the transparent lens 5 is attached to is assembled. After assembling the lighting system 1 in this way, when the lighting system 1 is inserted into a concave or the like provided on the interior member from the protective cover 4 side, the locking piece 54 of the transparent lens 5 is locked with an attaching portion of the interior member, and the locking portion 56 is engaged with the attaching portion of the interior member, an attachment of the lighting system 1 to a vehicle is finished.

Next, a configuration and a function of the bus bar 6 will be explained with reference to FIGS. 5 to 7. The bus bar 6 is made by punching and bending a conductive metal plate, and includes: a fixed portion 61 fixed to the housing 31 and connected to the electric wire; an extended portion 62 extended from the fixed portion 61; a wide width portion 63 widened at a tip of the extended portion 62; and a pair of terminal portions 64 (first terminal portion 64A and second terminal portion 64B) bent in the middle of extended portion 62 and continued. Incidentally, in this embodiment, the first bus bar 6A and the second bus bar 6B have the same shape and are the common configuration member, and as shown in FIG. 4, the first bus bar 6A and the second bus bar 6B face to each other in a mirror-reversed manner. Namely, the first bus bar 6A and the second bus bar 6B are attached to the housing 31 in a manner that the first bus bar 6A and the second bus bar 6B are line-symmetric to each other with respect to the center axis of the insertion hole 32 (coincident with the center axis of the bulb 2).

Figure 5:
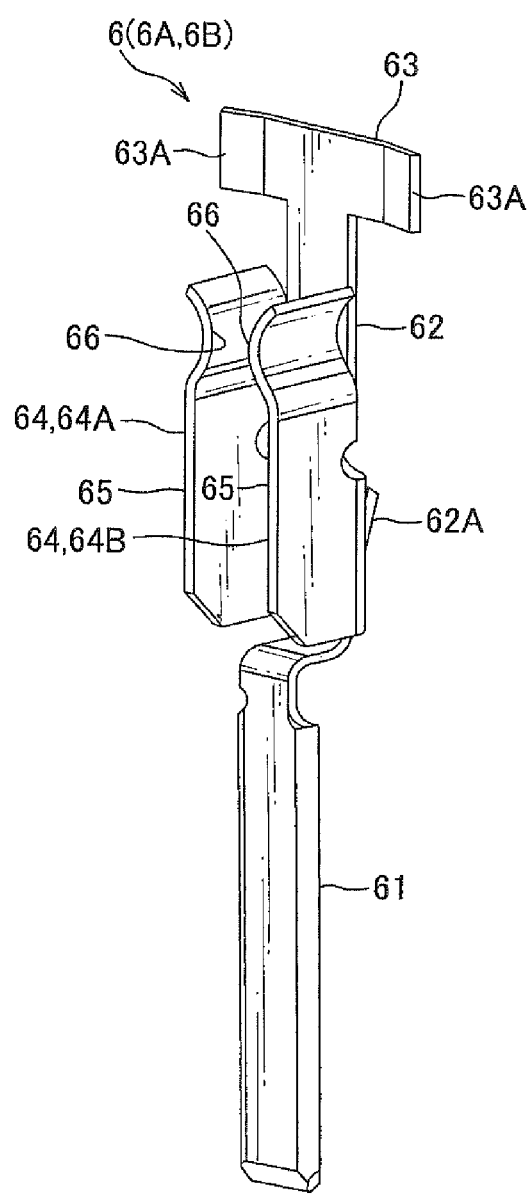
FIG. 5 is a perspective view showing a terminal fitting provided on the bulb socket.

The fixed portion 61 is formed in a long plate shape along a vertical direction of FIGS. 4 and 5 (same as the insertion direction of the bulb 2), and inserted into a rear side of the insertion hole 32 of the housing 31 along the same direction as the insertion direction of the bulb 2. The extended portion 62 is bent in a crank shape from the fixed portion 61 and extended toward an opening side of the insertion hole 32. A locking piece 62A for locking with an inside of the housing 31 is made by cutting and raising the metal plate in the middle of the extended portion 62. The wide width portion 63 is extended to both sides crossing the insertion direction from the tip of the extended portion 62 (tip at an opening side of the insertion hole 32). Namely, the extended portion 62 and the wide width portion 63 are formed in a T-shape. Held portions 63A are formed by bending obtusely at ends of both sides of the wide width portion 63. When the terminal holding portions 33 of the housing 31 hold these held portions 63A, the bus bar 6 is prevented from moving.

Each of the first terminal portion 64A and the second terminal portion 64B as the pair of terminal portions 64 includes: a spring portion 65 extended in a cantilever manner toward an open side of the insertion hole 32 from a bent part from the extended portion 62; and a contact portion 66 provided at a tip of the spring portion 65 and bent in a curved plate shape. Further, as shown in FIG. 4, the first terminal portion 64A and the second terminal portion 64B are provided facing each other and holding the center plane P1 extended along a facing direction of the pair of terminal portions 64 (left and right direction in FIG. 4) and through the center of the insertion hole 32 therebetween. In a bulb insertion condition that the base portion 22 of the bulb 2 is inserted into the insertion hole 32, the first terminal portion 64A is provided along the sidewall 25B of the flat plate portion 25 (or the sidewall 26B of the flat plate portion 26), and the second terminal portion 64B is provided along the sidewall 25C of the flat plate portion 25 (or the sidewall 26C of the flat plate portion 26).

Further, in the bulb insertion condition, the contact portion 66 of the first terminal portion 64A abuts on the contact lead wire 23 of the bulb 2, and the contact portion 66 of the second terminal portion 64B abuts on the sidewall 25C of the flat plate portion 25 (or the sidewall 26C of the flat plate portion 26) as the other side wall of the base portion 22 of the bulb 2. At this time, as shown by two-dot chain line in FIG. 6, the spring portion 65 of the first terminal portion 64A and the spring portion 65 of the second terminal portion 64B are elastically deformed by bending in a direction separating the contact portions 66 from each other, and generate biasing force at the contact portions 66 in a direction holding the base portion 22 of the bulb 2 therebetween. Thus, when the base portion 22 is held between the first terminal portion 64A and the second terminal portion 64B by the biasing force of the spring portions 65, a holding condition that the bulb 2 is held is established.

Figure 6:
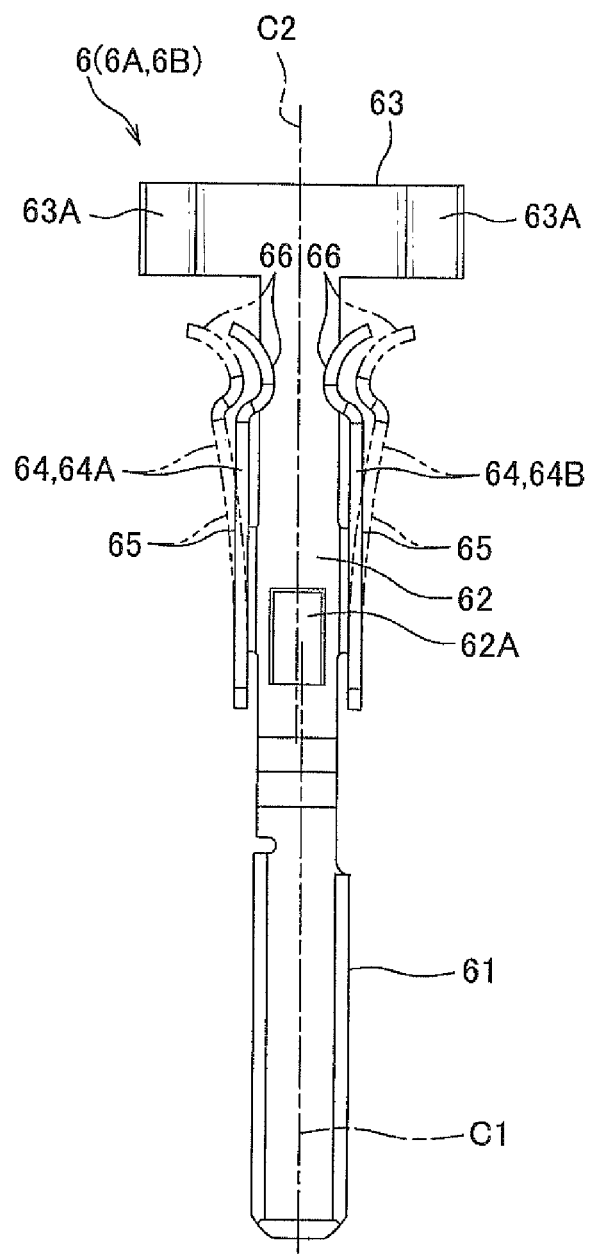
FIG. 6 is a side view showing the terminal fitting.

In contrast, in the natural condition that the base portion 22 of the bulb 2 is not inserted into the insertion hole 32, and the spring portions 65 are not elastically deformed, as shown by a solid line in FIG. 6, the contact portions 66 of the pair of terminal portions 64 are close to each other, and the spring portions 65 are substantially parallel to each other. Here, a center line C1 in a width direction of the fixed portion 61 and a center line C2 in a width direction of the extended portion 62 are eccentric to each other, and the center line C2 is displaced an eccentric distance e (see FIG. 7) toward the first terminal portion 64A with respect to the center line C1. Further, the pair of terminal portions 64 is bilaterally symmetric with respect to the center line C2 of the extended portion 62, and with the eccentricity of the extended portion 62 with respect to the fixed portion 61, the pair of terminal portions 64 is also eccentric the eccentric distance e with respect to the center line C1. Further, the bus bars 6A, 6B are held in the housing 31 in a manner that the center line C1 of the fixed portion 61 is coincident with the center plane P1 of the insertion hole 32 (see FIG. 4). Thereby, each of the pair of terminal portions 64 is displaced the eccentric distance e from the center plane P1 toward the first terminal portion 64A.

Figure 3C:
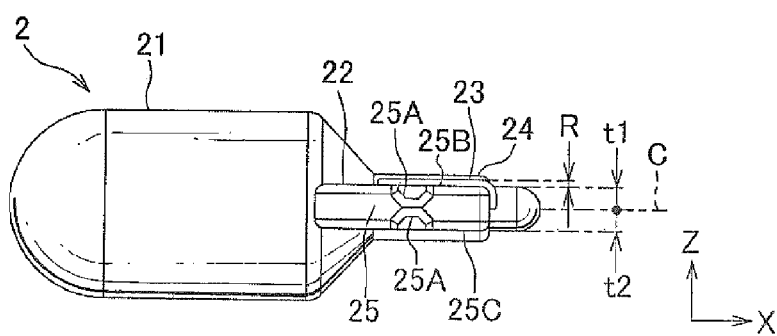
FIG. 3C is a view of three-view drawing showing the bulb.

The eccentric distance e of the pair of terminal portions 64 described above is set corresponding to the projection size R of the contact lead wire 23 of the base portion 22 of the bulb 2. In particular, as shown in FIGS. 3B and 3C, in the flat plate portions 25, 26 of the base portion 22, a distance t1 to the sidewalls 25B, 26B as the one side wall from a center plane P extended along Y direction through the center axis C (a plane coincident with the center plane P1 of the insertion hole 32 of the housing 31 shown in FIG. 4) and a distance t2 to the sidewalls 25C, 26C as the other side wall from the center plane P are the same (namely, t1=t2). Therefore, a distance from the center plane P, P1 to a surface of the contact lead wire 23 is the distance t1 to the sidewalls 25B, 26B plus the projection size R of the contact lead wire 23 (namely, t1+R). Therefore, the eccentric distance e is set so that the center line C2 as the center of the pair of terminal portions 64 is coincident with a position half of a distance from the surface of the contact lead wire 23 to the other sidewalls 25C, 26C (namely, t1+t2+R), namely, a position eccentric half of the projection size R (namely, R/2) toward the sidewalls 25B, 26B from the center of a thickness size of the flat plate portions 25, 26 (T=t1+t2) (namely, e=R/2).

Figure 7:
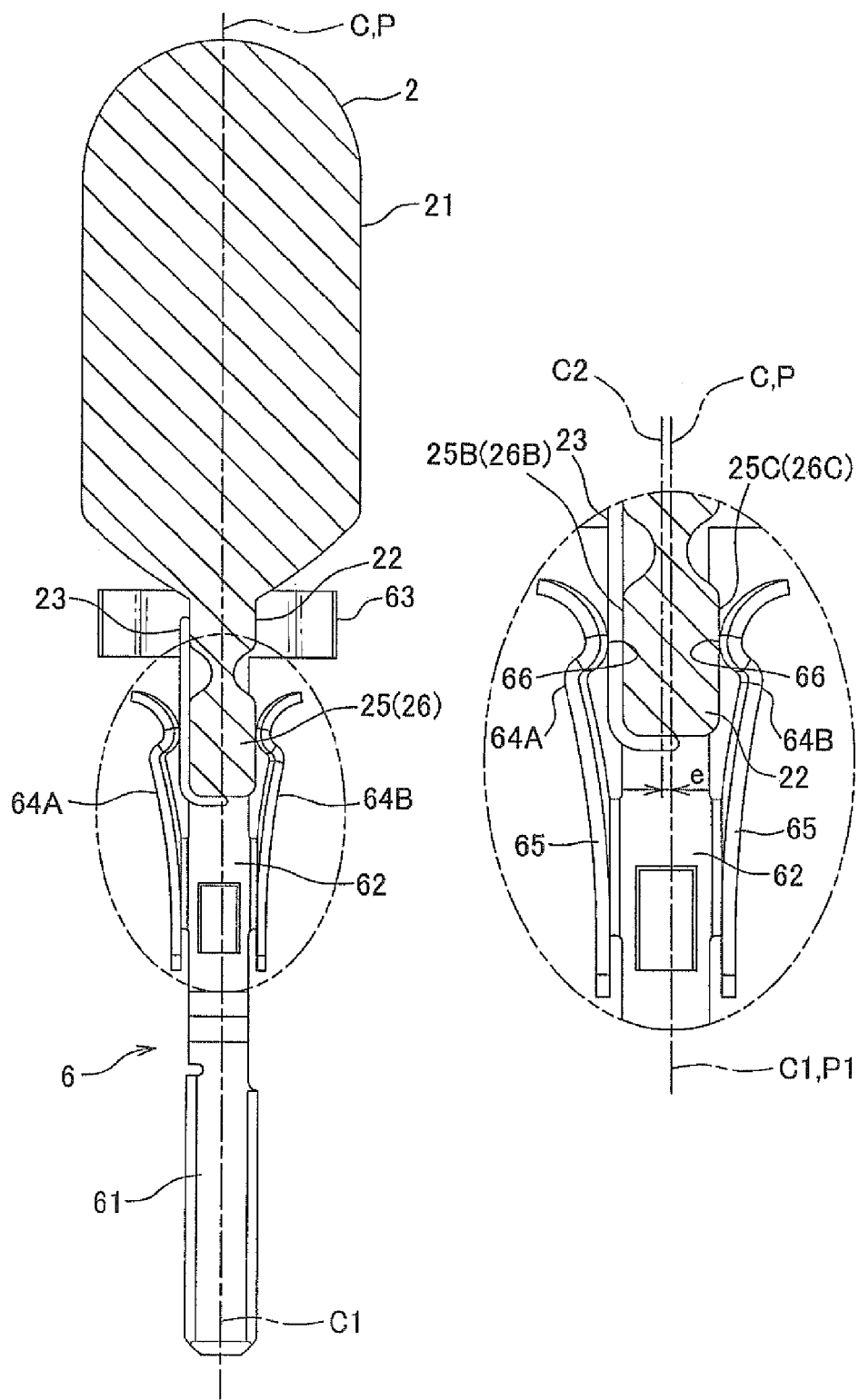
FIG. 7 is a partially sectional view showing the bulb held by the terminal fitting.
Figure 8:
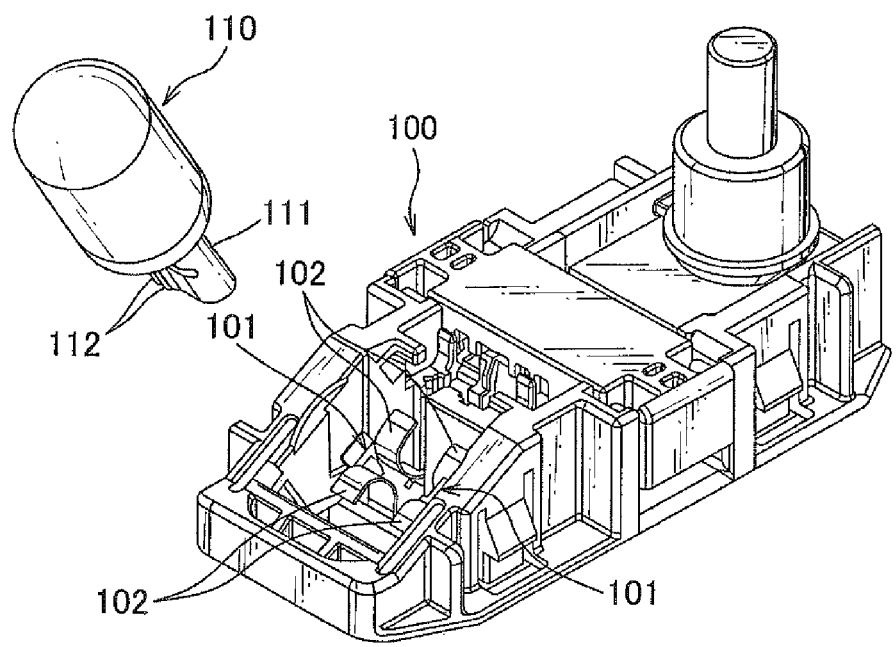
FIG. 8 is an exploded perspective view showing a conventional lighting system.

The bus bar 6 in which the eccentric distance e of the pair of terminal portions 64 is set as described above is held in the housing 31 in a condition that the center line C1 of the fixed portion 61 is coincident with the center plane P1 of the insertion hole 32 as shown in FIG. 7. Then, when the base portion 22 of the bulb 2 is inserted into the insertion hole 32 in a manner that the center plane P is coincident with the center plane P1 of the insertion hole 32, while the contact portion 66 of the first terminal portion 64A slidingly abuts on the surface of the contact lead wire 23, the spring portion 65 of the first terminal portion 64A is elastically deformed, and while the contact portion 66 of the second terminal portion 64B slidingly abuts on the sidewalls 25C, 26C, the spring portion 65 of the second terminal portion 64B is elastically deformed, so that the base portion 22 is held between the contact portions 66 as the holding condition. Moving distances of the contact portions 66 of the first terminal portion 64A and the second terminal portion 64B to the holding condition are the same, because the eccentric distance e of each terminal portion 64 from the center plane P1 (and the center axes C, C1) is set half of the projection size R of the contact lead wire 23 as described above.

According to this embodiment, the elastic deformation amounts of the first terminal portion 64A and the second terminal portion 64B from the natural condition to the holding condition can be equalized. Consequently, the biasing forces (stresses) of the pair of spring portions 65 also can be equalized. Therefore, the spring portions 65 of the first terminal portion 64A and the second terminal portion 64B are prevented from unequally settling, and the holding power of the bulb 2 is prevented from being reduced. Further, in the lighting system 1, the bulb 2 is prevented from rattling or falling out. Further, because the electric connection between the bus bar 6 and the bulb 2 is successfully maintained, a lighting trouble of the bulb 2 is also prevented. Further, by covering the bulb socket 3 holding the bulb 2 with the protective cover 4, an external force is hard to be applied to the bulb 2, and excessive stress to the spring portion 65 is prevented.

Incidentally, the above embodiment only shows a representative example of the present invention. The present invention is not limited to the embodiment. Namely, various modifications can be practiced within a scope of the present invention.

For example, in the above embodiment, the lighting system 1 mounted on a vehicle body is exemplarily shown. However, the present invention is not limited to this, and the lighting system 1 may be mounted on a building or the like. Further, in the above embodiment, the lighting system 1 includes: the protective cover 4 and the transparent lens 5 in addition to the bulb socket 3 for holding the bulb 2. However, the protective cover 4 and the transparent lens 5 are not essential, and can be omitted properly. Further, the lighting system 1 may include members other than the protective cover 4 and the transparent lens 5. Further, according to the present invention, the bulb 2 is not limited to the bulb 2 as the wedge base bulb. As long as the contact lead wire is provided on the one side wall of the base portion, various bulbs can be used. Further, a type of the light emitting portion in the bulb is not limited to an incandescent bulb and a halogen bulb. Any type of bulb such as fluorescent bulb and an LED bulb can be used.

REFERENCE SIGNS LIST 1 lighting system
2 bulb
3 bulb socket
4 protective cover
5 transparent lens
6 bus bar (terminal fitting)
6A first bus bar (first terminal fitting)
6B second bus bar (second terminal fitting)
21 light-emitting portion
22 base portion
23 contact lead wire
25B sidewall (one side wall and first wall)
25C sidewall (the other side wall)
26B sidewall (one side wall and second wall)
26C sidewall (the other side wall)
31 housing (socket main body)
32 insertion hole
61 fixed portion
64 terminal portion
64A first terminal portion
64B second terminal portion
65 spring portion
66 contact portion
C center axis
e eccentric distance
P, P1 center plane
R projection size

The invention claimed is:

1. A bulb socket for holding a bulb having a light-emitting portion, a base portion, and a contact lead wire provided on one side wall of the base portion,
said bulb socket comprising:
a socket main body having an insertion hole for receiving the base portion of the bulb;
a terminal fitting attached to the socket main body and configured to be electrically connected to the contact lead wire,
wherein the terminal fitting has a fixed portion to be fixed to the socket main body and a pair of terminal portions extended from the fixed portion,
wherein the pair of terminal portions is composed of a first terminal portion to be extended along the one side wall of the base portion which is inserted into the insertion hole, and a second terminal portion to be extended along the other side wall opposite to the one side wall of the base portion, said first and second terminal portions facing each other across a center plane between the one and the other side walls,
wherein each of the first and second terminal portions has a spring portion for biasing in a direction holding the base portion, and a contact portion provided at a tip of the spring portion,
wherein the contact portion of the first terminal portion is provided in a manner able to abut on the contact lead wire, and the contact portion of the second terminal portion is provided in a manner able to abut on the other side wall of the base portion,
wherein a base end of the pair of terminal portions is formed eccentrically toward one side from the center plane in a natural condition that the bulb is not inserted and the spring portions are not elastically deformed, and this eccentric distance is set less than a projection size R of the contact lead wire projected from the one side wall of the base portion, and
wherein the eccentric distance is set to configure movement of each of the contact portions of the first and second terminals relative to the fixed portion by an equal amount when the base portion of the bulb is received in the socket main body.

2. The bulb socket as claimed in claim 1,
wherein in the natural condition, the eccentric distance of the pair of terminals relative to the center plane is set half the projection size of the contact lead wire.

3. The bulb socket as claimed in claim 1,
wherein the base portion of the bulb has first and second walls symmetric to each other with respect to a center axis of the base portion in the center plane, and the contact lead wires are respectively provided on the first and second walls,
wherein the terminal fitting is composed of a pair of a first terminal fitting able to abut on the contact lead wire provided on the first wall and a second terminal fitting able to abut on the contact lead wire provided on the second wall.

4. The bulb socket as claimed in claim 2,
wherein the base portion of the bulb has first and second walls symmetric to each other with respect to a center axis of the base portion in the center plane, and the contact lead wires are respectively provided on the first and second walls,
wherein the terminal fitting is composed of a pair of a first terminal fitting able to abut on the contact lead wire provided on the first wall and a second terminal fitting able to abut on the contact lead wire provided on the second wall.

5. A lighting system comprising:
the bulb socket described in claim 1;
a bulb held in the bulb socket;
a protective cover covering the bulb socket and the bulb; and
a transparent lens fixed to the bulb socket and the protective cover and through which light from a light-emitting portion of the bulb passes.

6. A lighting system comprising:
the bulb socket described in claim 2;
a bulb held in the bulb socket;

a protective cover covering the bulb socket and the bulb; and a transparent lens fixed to the bulb socket and the protective cover and through which light from a light-emitting portion of the bulb passes.

7. A lighting system comprising:
the bulb socket described in claim 3;
a bulb held in the bulb socket;
a protective cover covering the bulb socket and the bulb; and
a transparent lens fixed to the bulb socket and the protective cover and through which light from a light-emitting portion of the bulb passes.

8. A lighting system comprising:
the bulb socket described in claim 4;
a bulb held in the bulb socket;
a protective cover covering the bulb socket and the bulb; and
a transparent lens fixed to the bulb socket and the protective cover and through which light from a light-emitting portion of the bulb passes.

9. A bulb socket for holding a bulb having a light-emitting portion, a base portion, and a contact lead wire provided on one side wall of the base portion,
said bulb socket comprising:
a socket main body having an insertion hole for receiving the base portion of the bulb; and
a terminal fitting attached to the socket main body and configured to be electrically connected to the contact lead wire, wherein the terminal fitting has a fixed portion to be fixed to the socket main body and a pair of terminal portions extended from the fixed portion, wherein the pair of terminal portions is composed of a first terminal portion to be extended along the one side wall of the base portion which is inserted into the insertion hole, and a second terminal portion to be extended along the other side wall opposite to the one side wall of the base portion, said first and second terminal portions facing each other across a center plane between the one and the other side walls, wherein each of the first and second terminal portions has a spring portion for biasing in a direction holding the base portion, and a contact portion provided at a tip of the spring portion, wherein the contact portion of the first terminal portion is provided in a manner able to abut on the contact lead wire, and the contact portion of the second terminal portion is provided in a manner able to abut on the other side wall of the base portion, wherein a base end of the pair of terminal portions is formed eccentrically toward one side from the center plane in a natural condition that the bulb is not inserted and the spring portions are not elastically deformed, and this eccentric distance is set less than a projection size R of the contact lead wire projected from the one side wall of the base portion, and wherein the pair of terminal portions are formed in bilaterally symmetrical shape with respect to a center axis of the socket main body.

* * * * *